United States Patent [19]

Whitlow

[11] Patent Number: 4,795,174
[45] Date of Patent: Jan. 3, 1989

[54] HIGH TEMPERATURE-HIGH PRESSURE GASKET ASSEMBLY

[75] Inventor: Gary L. Whitlow, Freeport, Tex.

[73] Assignee: The Dow Chemical Company, Midland, Mich.

[21] Appl. No.: 547,182

[22] Filed: Oct. 31, 1983

Related U.S. Application Data

[63] Continuation-in-part of Ser. No. 352,278, Feb. 25, 1982, abandoned.

[51] Int. Cl.⁴ .............................................. F16J 15/12
[52] U.S. Cl. .................................. 277/213; 277/235 B
[58] Field of Search ............................ 277/213, 235 B

[56] References Cited

U.S. PATENT DOCUMENTS

| | | | |
|---|---|---|---|
| 922,130 | 5/1909 | Goetze | 277/213 |
| 926,841 | 7/1909 | Bartlett | 277/213 |
| 1,030,055 | 6/1912 | Darlington | 277/213 |

OTHER PUBLICATIONS

Operation, Maintenance and Repair of Pfaudler Glased-Steel Equipment, Sec. 4, Gaskets.

Primary Examiner—Robert S. Ward
Attorney, Agent, or Firm—Melvin W. Barrow

[57] ABSTRACT

An economical gasket assembly for use between glass-lined flanges of sections of glass-lined vessels, which flanges are subject to greater seating stress due to higher temperatures or pressures, which gasket assembly will maintain a seal but not break the glass on the flange seating surface due to the use of a plurality of flexible, compressible corrugated metal sheets interleaved between harder than normal layers of gasket filler material.

20 Claims, 2 Drawing Sheets

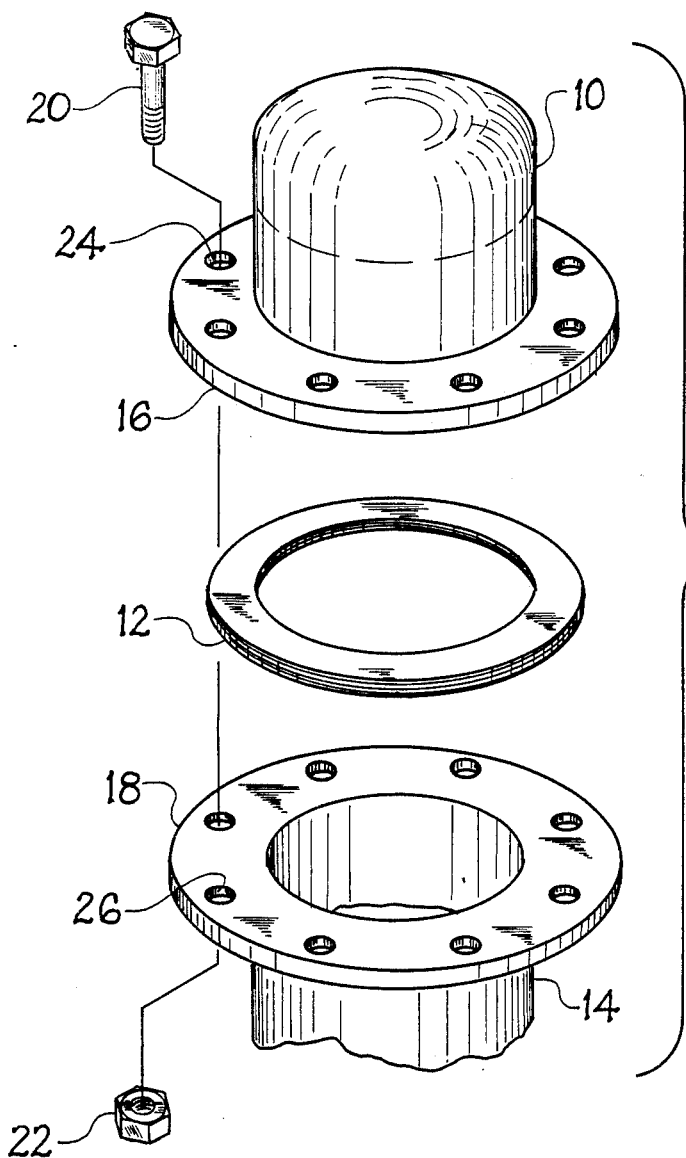
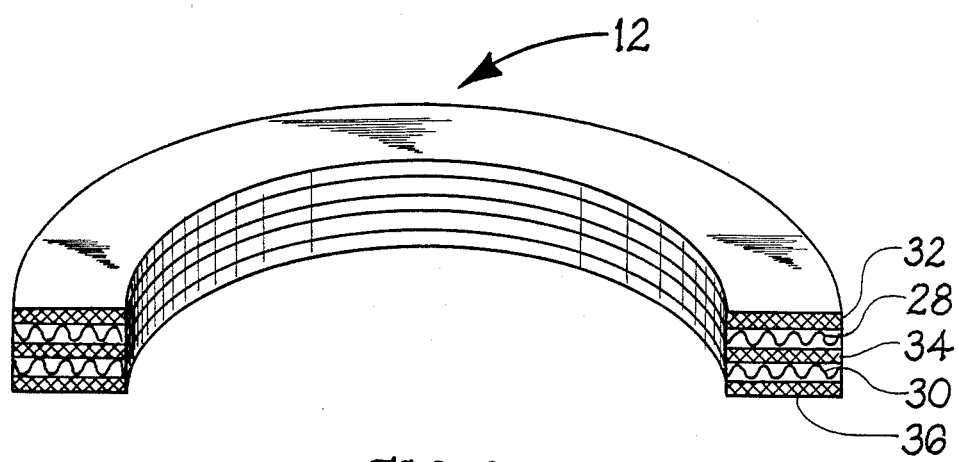

HIGH TEMPERATURE-HIGH PRESSURE GASKET ASSEMBLY

CROSS-REFERENCE TO RELATED APPLICATION

This application is a continuation-in-part of Ser. No. 352,278 filed Feb. 25, 1982, abandoned.

BACKGROUND OF THE INVENTION

1. Field of The Invention

This invention relates to the field of gaskets which are used in joints of lined vessels and conduits, which linings are non-machined non-metallic, non-corrosive materials such as glass and which require gaskets to form a seal between joints in these vessels and conduits without breaking the brittle lining while at the same time the gasket and brittle joint lining are subjected to high temperatures and high pressure-temperature coefficients.

2. Definition Used Herein

Vessel as used herein is used to include those conduits such as pipes through which liquids can flow as well as those containers in which liquid is confined for some period of time.

3. Discussion of Prior Art

There are many varied types of metal vessels used in chemical and food processes and the like and in the transportation of fluids. Many of these vessels require linings of material which are resistant to corrosion of the fluids these vessels contain or transport. Examples of vessels which are often so lined are reactors, columns, mixers, pipelines, storage tanks, pipe valves, evaporators, dryers, blenders, and the like.

Necessarily these vessels often are in sections, and thus have connecting joints such as flanged joints to connect these sections. For example, flanged pipes and Pfaudler kettles are examples of such vessels having flanged joints.

Most often these vessels are made of metal in industrial sized application. This is true even when the liquid which the vessel is to contain, or is to transfer, is corrosive with respect to the metal. To avoid this corrosion these vessels are often lined with non-corrosive linings. Economics usually dictate that these linings be made of the cheapest materials available which will serve the purpose at hand. These cheaper, non-corrosive materials most often turn out to be non-metallic materials as opposed to the non-corrosive precious metals which are very expensive. Examples of these non-metallic lining materials are glass, ceramic, enamel, fused silica, fused quartz, boro-silicates, Herisite, stoneware, and the like which are well known to those skilled in the art of vessel construction.

These relatively cheaper lining materials, however, are all quite brittle when compared to the metal walls of the vessels of which they are used to line. This brittleness turns out to be a quite complicating factor when determining what gaskets can be used in the joints when the different sections of the vessel are connected together such as by latches or flange bolts. This complication arises from the necessity of choosing a gasket which is not only resistant to the corrosive liquid in the vessel, but is also at the same time both (a) sufficiently soft so as not to break the brittle linings on the vessel joints seating surfaces, and (b) sufficiently resistant to gasket cold flow at the temperature at which the vessel is to operate so as not to loose the seal it is intended to provide.

A further complicating factor arises from the fact that these linings are very seldom machined so as to provide a flat surface on the flange seating surfaces. For example, glass linings are usually left in what is referred to in the trade as an "as-fired" condition. The cost of machining such surfaces into a flattened condition is quite high. It is known that when non-flat surfaces, that is non-machined surfaces, are subjected to a compressive load such as when opposing flange faces are bolted tight, then this load is unevenly distributed across the non-flat surfaces with the higher portions of the surface taking much more of the load than the lower portions. When non-brittle or soft surfaces are used, then the uneven surface is known to deform toward an even surface so as to spread this load more uniformly. With brittle surfaces, however, very little of this deformation occurs resulting in surface breakage. Thus, here again the brittleness of these non-metallic lining materials works against the capability of tightly squeezing together flanged joints which are lined with such materials.

A caveat should be made here with respect to glass, ceramics, and other glass-like materials used for such linings. This caveat is that although these materials form a smooth surface in their as-fired state, they very seldom have a flat surface. Rather they have an undulating or wave-like surface which suffers the same load maldistribution problems as do other brittle, non-machined (i.e. not flattened) surfaces.

Engineers and gasket manufacturers have developed different materials and rating systems for gaskets to be used in sealing joints of vessels lined with these brittle, non-metallic linings. Examples of such gasket materials are blue (soft) asbestos, SBR (synthetic butyl rubbers), natural rubber, neoprene elastomers, nitrile rubbers, cellulose fibers, cork, and various kinds of plastics such as the TEFLON (tetrafluoroethylene fluorocarbon) polymers). (TEFLON is a trademark of the E. I. DuPont de Nemeurs and Company of Delaware). These gasket materials are often used in combination with one another and with various kinds of binders to achieve the seal required for the specific task at hand. Gaskets of different layers of these materials are also used. However, for the brittle lined vessels, one common thread of gasket design is present, and that is that the gaskets be sufficiently flexible and soft to sufficiently be compressed between the brittle, uneven, wavy lined seating surfaces of the vessel joints to form a seal without breaking the brittle lining on these seating surfaces.

Heretofore such a seal has been accomplished by concentrating on the surfaces of the gasket which contacted these brittle linings of the vessel joint seating surfaces. These surface materials have been chosen to be soft enough to accomodate the brittle lining on the opposed seating surfaces of the joint flanges when subjected to the seating stress pressures required to make a seal between the flanges.

One problem with this approach, however, is that the softer the gasket material is, the more prone it is to "cold flow" over a period of time and lose its seal. This is particularly true for such gasket materials as the operating temperature to which the gasket is exposed is increased. The material becomes hot enough to slowly flow in and from the joint during "cold flow".

To help understand the approach which design engineers have taken in the past to solve the problems associated with making these gaskets, reference is made to FIGS. 3 and 4. Therein is disclosed a top view (FIG. 3) and a side sectional view (FIG. 4) taken along the line 4—4 in FIG. 3 of a typical prior art gasket 40. The inner gasket body is made of a layer 42 of a soft gasket substance such as blue asbestos as a filler for the outer envelope 44 of the gasket body. More than one layer is sometimes used to form this inner gasket body 42. Be that as it may, however virtually all of such gaskets involving higher temperature and pressure conditions employ a softer envelope 44 to do several things. This envelope is made of a soft material such as Teflon so as: (1) to be soft enough to conform to the uneven gasket surface, and (2) to have a high enough melting point to avoid cold flow. To avoid leakage between the asbestos filler 42 and the Teflon layers on either side of it, the outer Teflon gasket body is formed in a shape so that the inner surface 46 of the gasket assembly 40 is a continuous Teflon wall. Thus the only surface presented to the corrosive fluid inside the gasket is the inner wall 46 of the Teflon envelope. Teflon is soft enough and has sufficiently superior corrosion resistant and cold flow resistant properties to be quite useful in most applications. But what happens when the vessel operating temperature has to be so hot that the soft Teflon envelope cold flows until the seal is lost? The present invention provides an economical gasket assembly whose design is such that it can be used in lined joints operating at temperatures above the maximum temperature rating of the soft envelope materials such as Teflon.

Besides maximum temperature, a second rating by which gaskets are measured is their pressure-temperature coefficient. This coefficient is the maximum mathematical product of the temperature at which the gasket is expected to function and the pressure of the fluid in the vessel tending to push the gasket out of the vessel joint. If the vessel design parameters call for a gasket which exceeds either its maximum cold-flow temperature rating or its pressure-temperature coefficient rating, then another gasket material has to be found. But as stated above the soft gasket materials normally used have low temperature ratings. They also have low ratings. They also have low pressure-temperature coefficient ratings. But yet again, many process efficiency improvements are calling for higher and higher temperatures and pressures.

It would, therefore, be advantageous to have a gasket which could meet these higher temperature and pressure requirements while still using relatively cheap gasket materials so that the relatively cheap non-metallic, non-corrosive linings can be used.

The present invention provides such a gasket by changing the design concept of such gaskets. It discards the prevailing concept that the gasket seating surface themselves must be the only part of the gasket that is so soft so as to conform to the brittle, non-flat seating surfaces of the joint. Rather it provides the flexibility required for not breaking the brittle lining, but still sealing such linings by use of a plurality of corrugated metal sections alternating with sections of gasket filler material in the interior of the gasket. The very low modulus of elasticity or softness once thought necessary for the gasket seating faces themselves to have is replaced with the concept of raising the modulus of elasticity of these seating surfaces but decreasing the modulus of elasticity of the whole gasket assembly. The harder gasket seating surfaces increases the temperature at which the vessel can operate with the gasket maintaining its seal.

SUMMARY OF THE INVENTION

The present invention is a substantially flat gasket assembly having two seating surfaces. It is suitable for use between the cheaper non-metallic, non-machined vessel linings, such as glass-linings on vessel flange joint seating surfaces operated at relatively high temperatures and at high pressure-temperature coefficients without breaking the lining on the flange joint seating surface. The invention is comprised of a plurality of corrugated metal reinforcing sheets interleaved between alternating layers of substantially flat gasket filler material. The layers of gasket filler material and sheets of corrugated metal are alternated such that the two outside surfaces, i.e. the two seating surfaces, of the gasket assembly are layers of gasket filler material, not corrugated metal sheets. The corrugations of the corrugated metal reinforcing sheets are annualarly concentric as opposed to being radially concentric. The gasket assembly does not require an envelope.

For this assembly to perform the task of maintaining its sealing function at elevated pressures or elevated temperatures, the corrugated metal reinforcing sheets should be made of a metal which has a modulus of elasticity, which is less than about 33,000,000 pounds per square inch while the gasket filler material is made of a non-metallic material which is sufficiently hard to have a pressure-temperature coefficient which is greater than about 75,000 pounds per square inch gauge degrees fahrenheit (psig °F.). Preferably the gasket filler material is not so hard that it has a pressure-temperature coefficient which is greater than about 320,000 psig °F. A more satisfactory filler material is one that has a pressure-temperature coefficient which is no greater than about 250,000 psig °F. In some cases the filler material needs to be such that it has a pressure-temperature coefficient which is greater than about 150,000 psig °F. This assembly is particularly suitable for operating temperatures of from about 375° to about 800° F.

Representative of gasket filler material having the above pressure-temperature coefficients are: J-M Style No. 60 obtainable from Johns-Manville, located in Greenwood Plaza, Denver, Colo.; J-M Style No. 78 obtainable from Johns-Manville, located in Greenwood Plaza, Denver, Colo.; and Garlock Style 900 obtainable from Garlock Inc., located in Palmyra, N.Y.

Representative metals suitable for use in making the corrugated metal sheets are aluminum, nickel, copper, stainless steel, carbon steel, inconel, hastelloy, monel (nickel-copper), and the like.

Of course, the filler material and metal for the corrugated metal sheets must be chosen so as not to be extensively corroded or dissolved by the particular environment to which it is to be exposed.

BRIEF DESCRIPTION OF THE DRAWING

A better understanding of the invention may be had by reference to the drawing wherein like parts in the different figures are referred to by the same reference number and wherein:

FIG. 1 is an exploded, isometric view of a glass-lined vessel employing a gasket between flange joints used to connect different sections of the vessel with the seating surfaces of said flange joints also being glass-lined; and FIG. 2 is an exploded isometric view of the gasket assembly of this invention, taken in half-section, showing the alternating layers of corrugated metal reinforcing rings interleaved between alternating layers of gasket filler material.

DETAILED DESCRIPTION OF THE PREFERRED EMBODIMENT

Figure 3:
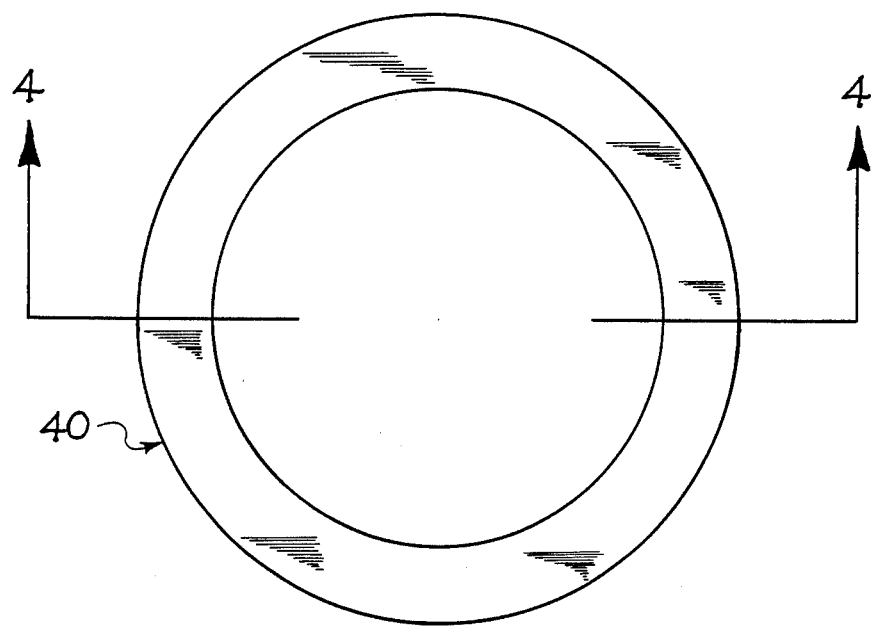
FIG. 3 is a top view of representative prior art gasket used to seal flanged joints of vessels lined with brittle linings such as glass.
Figure 4:
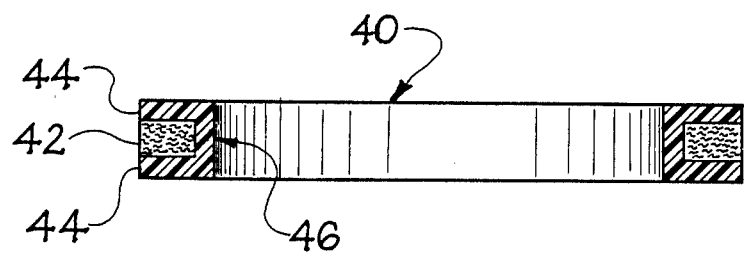
FIG. 4 is a side view of the prior art gasket of FIG. 3 taken in section along line 4—4 in FIG. 3.

Referring to FIG. 1, a high pressure, as-fired-glass-lined vessel can be seen. The glass is not shown, but it covers the interior of the vessel as well as the flange's seating surfaces as is customary when protecting the metal of the vessel from corrosive liquids contained therein. A vessel head 10 is shown for the vessel as is a vessel body 14. Vessel head 10 has an as-fired, glass-lined flange 16 on its lower portion while vessel body 14 has a glass-lined flange 18 attached to its upper portion. The lower side of glass-lined flange 16 and the upper side of flange 18 form the opposing seating surfaces of the flanges 16, 18. Flange 16 and flange 18 comprise a flange joint, of course, to connect together in a sealed fashion the shown parts of the vessel. Between the opposed seating surfaces of flanges 16 and 18 is located a gasket assembly 12 made in accordance with this invention.

Vessel head 10 is bolted tightly to vessel body 14 by bolts 20 and nuts 22. Bolts 20 pass through bolt holes 24 and 26 which occur in flanges 16 and 18, respectively. How tight these bolts 20 have to be in forming a sealed flange joint, of course, is dictated by the amount of force required between the flanges 16, 18 to prevent leakage between the flanges of the hot, pressurized fluid (not shown) contained inside the vessel. The gasket assembly 12 is present, of course, to help prevent this leakage.

The gasket design problem arises because of the presence of the brittle glass on the seating surfaces. The problem may be stated by asking the question: How is it possible to economically raise the force on the flange seating faces by tightening the bolts 20 without breaking the glass lining on the flange seating faces at elevated temperatures at which commonly used economical gasketing materials will creep and leak if they are those gasketing materials chosen so they not to break the glass? The answer is a harder gasketing filler material whose hardness is compensated for by giving the total gasket assembly a greater flexibility through the use of a plurality of flexible corrugated metal rings interleaved between the harder gasket filler material.

This arrangement is clearly shown in FIG. 2 wherein two corrugated metal rings 28, 30 are interleaved between three layers 32, 34, 36 of gasket filler material.

This gasket assembly does not require any envelopes to keep the gasket from leaking or the gasket assembly from blowing out the side due to the pressure of the fluid inside the vessel.

More alternating layers of corrugated metal sheets and layers of gasketing material may be used than that shown in the drawing.

What is claimed is:

1. A substantially flat gasket assembly having two seating surfaces, which gasket assembly is situated between vessel flange joints which are lined with a non-metallic lining, which is operated at high temperatures and pressures, and which gasket assembly is comprised of:

a plurality of corrugated metal reinforcing sheets interleaved between alternating layers of gasket filler material in such a fashion so that the two seating surfaces of the gasket device are layers of the gasket filler material instead of corrugated metal sheets;

said corrugations of said metal reinforcing sheets being annularly concentric as opposed to being radially concentric;

said corrugated metal reinforcing sheets having a modulus of elasticity of less than about 33,000,000 pounds per square inch;

said gasket filler material being non-metallic but sufficiently hard so that each layer of it has a pressure-temperature coefficient which is greater than about 75,000 pounds per square inch gauge degrees Fahrenheit (psig °F.), and a temperature rating greater than about 375° F.; and said gasket assembly not employing an envelope.

2. The gasket assembly of claim 1 wherein the gasket filler material has a pressure-temperature coefficient which is no greater than about 320,000 psig °F.

3. The gasket assembly of claim 1 wherein the gasket filler material has a pressure-temperature coefficient which is no greater than about 250,000 psig °F.

4. The gasket assembly of claim 1 wherein the gasket filler material has a pressure-temperature coefficient which is greater than about 150,000 psig °F.

5. The gasket assembly of claim 4 wherein the gasket filler material has a pressure-temperature coefficient less than about 320,000 psig °F.

6. The gasket assembly of claim 4 wherein the gasket filler material has a pressure-temperature coefficient which is less than about 250,000 psig °F.

7. The gasket assembly of claims 1, wherein the gasket filler material has a maximum temperature rating greater than 500° F.

8. The gasket assembly of claim 1 wherein there is no envelope employed.

9. An article of manufacture comprised of a substantially flat gasket assembly fitted between the two opposing seating surfaces of the flanges of a flange joint connecting two portions of a vessel, with at least a part of the interior of said vessel and at least the seating surfaces of said flange joint being lined with a brittle, non-machined, non-metallic lining;

with said gasket assembly being comprised of a plurality of corrugated metal reinforcing sheets interleaved between layers of gasket filler material in such a fashion so that the two seating surfaces of the gasket device are layers of the gasket filler material instead of the corrugated metal sheets;

the corrugations of said corrugated metal reinforcing sheets being annularly concentric as opposed to being radially concentric;

said corrugated metal reinforcing sheets having a modulus of elasticity of less than about 33,000,000 pounds per square inch;

said gasket filler material being non-metallic but sufficiently hard so that each layer of it has a pressure-temperature coefficient which is greater than about 75,000 pounds per square inch gauge degrees Fahrenheit (psig °F), and a temperature rating which is greater than about 375° F.; and said gasket assembly not employing an envelope.

10. The article of manufacture of claim 9 wherein the brittle, non-metallic lining is an as-fired glass lining.

11. The article of manufacture of claim 9 wherein there is no envelope used as part of the gasket assembly.

12. The gasket assembly of claim 9 wherein the gasket filler material has a pressure-temperature coefficient which is no greater than about 320,000 psig °F.

13. The gasket assembly of claim 9 wherein the gasket filler material has a pressure-temperature coefficient which is no greater than about 250,000 psig °F.

14. The gasket assembly of claim 9 wherein the gasket filler material has a pressure-temperature coefficient which is greater than about 150,000 psig °F.

15. The gasket assembly of claim 14 wherein the gasket filler material has a pressure-temperature coefficient less than about 320,000 psig °F.

16. The gasket assembly of claim 14 wherein the gasket filler material has a pressure-temperature coefficient which is less than about 250,000 psig °F.

17. The gasket assembly of claim 9 wherein the gasket filler material has a maximum temperature rating greater than 500° F.

18. The article of manufacture of claim 11 wherein the gasket filler material has a maximum temperature rating which is greater than 500° F. and which has a pressure-temperature coefficient which is greater than about 150,000 psig °F.

19. The article of manufacture of claim 18 wherein the brittle, non-machined, non-metallic lining is glass.

20. The article of manufacture of claim 19 wherein the gasket filler material has a pressure-temperature coefficient which is less than about 320,000 psig °F.

* * * * *